T. E. MURRAY.
VALVE.
APPLICATION FILED FEB. 16, 1918.
1,270,050.
Patented June 18, 1918.
Fig: 1.
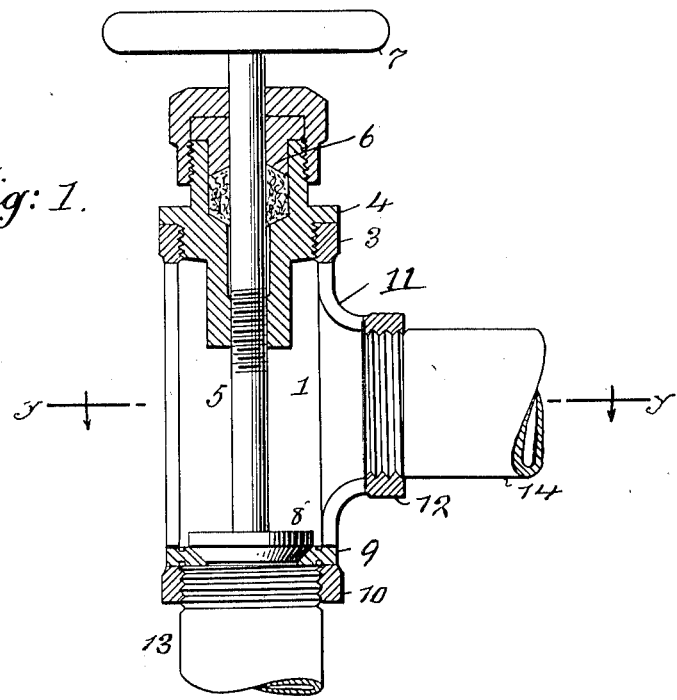
Fig: 2.
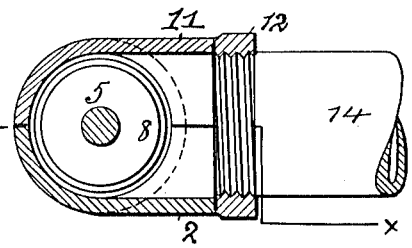
INVENTOR
Thomas E. Murray
BY Park/Benjamin
his ATTORNEY

UNITED STATES PATENT OFFICE.

THOMAS E. MURRAY, OF NEW YORK, N. Y.

VALVE.

1,270,050.

Specification of Letters Patent.

Patented June 18, 1918.

Application filed February 16, 1918. Serial No. 217,492.

*To all whom it may concern:*

Be it known that I, THOMAS E. MURRAY, a citizen of the United States, residing at New York, in the county of New York and State of New York, have invented a certain new and useful Improvement in Valves, of which the following is a specification.

The invention is an elbow valve and consists in the construction hereinafter set forth, whereby the device is simplified and cheapened.

In the accompanying drawings—

Figure 1 is a section of my valve on the line x, x of Fig. 2. Fig. 2 is a section on the line y, y of Fig. 1.

Similar numbers of reference indicate like parts.

The valve shell has its body portion formed in two longitudinal sections 1, 2, stamped, pressed or struck up from sheet metal and electrically welded together at their meeting edges. To one end of said body portion is welded an internally threaded reinforcing ring 3, which receives a correspondingly threaded cover sleeve 4. The sleeve 4 is internally threaded to receive the threaded valve stem 5 which extends through a stuffing-box 6 carried by said sleeve and is provided with a hand-wheel 7. The stem 5 carries the valve 8, the beveled circumferential edge of which is seated in a correspondingly formed opening in a metal disk 9 which is welded to the end of the shell. To said disk in turn is welded an internally threaded reinforcing ring 10, similar to ring 3. On the lateral projection 11 of the valve shell is welded a third internally threaded reinforcing ring 12, similar to rings 10 and 3. The ends of the pipes 13, 14, between which the valve shell is interposed and forms an elbow, engage in the threaded rings 10 and 12. The valve is opened or closed by suitably rotating the hand-wheel 7.

I claim:

1. A T-shaped tubular valve shell, an annular valve seat at one end thereof, a cover at the opposite end, means for operating said valve extending through said cover, and means welded to the remaining end of said shell and to the valve seat for connecting pipes thereto.

2. A tubular valve shell having a lateral tubular projection, reinforcing rings respectively welded to one end of said shell and to the end of said tubular projection, a cover on the ring welded to said shell, a valve stem extending through said cover, a valve carried by said stem, a disk having an opening forming a seat for said valve welded to the opposite end of said shell, and a reinforcing ring welded to said disk.

3. In the combination of claim 1, the said valve shell being formed in two longitudinal half sections struck up from sheet metal and electrically welded at their meeting edges.

In testimony whereof I have affixed my signature in presence of two witnesses.

THOMAS E. MURRAY.

Witnesses:
GERTRUDE T. PORTER,
MAY T. McGARRY.